US012005533B2

(12) United States Patent
Jochman

(10) Patent No.: US 12,005,533 B2
(45) Date of Patent: Jun. 11, 2024

(54) SYSTEMS AND METHODS FOR AUTOMATIC RANGE CONTROL

(71) Applicant: Illinois Tool Works Inc., Glenview, IL (US)

(72) Inventor: Nathan Joe Jochman, Menasha, WI (US)

(73) Assignee: Illinois Tool Works Inc., Glenview, IL (US)

( * ) Notice: Subject to any disclaimer, the term of this patent is extended or adjusted under 35 U.S.C. 154(b) by 219 days.

(21) Appl. No.: 15/720,012

(22) Filed: Sep. 29, 2017

(65) Prior Publication Data

US 2019/0099825 A1 Apr. 4, 2019

(51) Int. Cl.
*B23K 9/10* (2006.01)
*B23K 9/095* (2006.01)
*B23K 10/00* (2006.01)
*B23K 10/02* (2006.01)

(52) U.S. Cl.
CPC ............ *B23K 9/1062* (2013.01); *B23K 9/095* (2013.01); *B23K 9/10* (2013.01); *B23K 9/1012* (2013.01); *B23K 9/1043* (2013.01); *B23K 10/006* (2013.01); *B23K 10/02* (2013.01)

(58) Field of Classification Search
CPC .......... B23K 9/09; B23K 9/091; B23K 9/095; B23K 9/0953; B23K 9/10; B23K 9/1012; B23K 9/1043; B23K 9/1056; B23K 9/1062; B23K 10/006; B23K 10/02
USPC .. 219/133, 134, 136, 130.01, 130.1, 130.21, 219/130.31, 130.32, 130.33
See application file for complete search history.

(56) References Cited

U.S. PATENT DOCUMENTS

| | | | |
|---|---|---|---|
| 6,204,476 B1* | 3/2001 | Reynolds | B23K 9/091 219/130.51 |
| 6,335,513 B1 | 1/2002 | Baum | |
| 2004/0196128 A1* | 10/2004 | DuVal | H01F 37/00 336/60 |
| 2006/0243716 A1* | 11/2006 | Stava | B23K 9/093 219/130.5 |
| 2007/0181553 A1 | 8/2007 | Stanzel et al. | |
| 2013/0341307 A1* | 12/2013 | Sickels | B23K 9/12 219/74 |
| 2014/0001167 A1* | 1/2014 | Bunker | B23K 9/1043 219/130.21 |
| 2014/0144898 A1* | 5/2014 | Upton | B23K 9/1087 219/132 |

(Continued)

FOREIGN PATENT DOCUMENTS

EP 1698420 9/2006

OTHER PUBLICATIONS

Int'l Search Report and Written Opinion Appln No. PCT/US2018/052444 dated Jan. 14, 2019.

*Primary Examiner* — Justin C Dodson
(74) *Attorney, Agent, or Firm* — MCANDREWS HELD & MALLOY, LTD

(57) ABSTRACT

An output control for a welding-type power supply includes a first contactor associated with a first weld output range. A second contactor associated with a second weld output range. An input device configured to select a weld output value from the first weld output range and the second weld output range. A control circuit configured to control the first contactor and the second contactor based on a selected weld output value, and adjust a weld output based on the selected weld output value of the input device.

19 Claims, 3 Drawing Sheets

(56) References Cited

U.S. PATENT DOCUMENTS

2014/0238966 A1* 8/2014 Radtke ................ B23K 9/1068
219/133
2015/0239057 A1* 8/2015 Farah ................... B23K 9/1006
219/130.21
2017/0225254 A1 8/2017 Ulrich et al.

* cited by examiner

SYSTEMS AND METHODS FOR AUTOMATIC RANGE CONTROL

BACKGROUND

Welding power systems can provide a range of outputs. A desired output can vary depending on the type of tool in use (e.g., a MIG welder, plasma torch, etc.), as well as material to be welded (e.g., aluminum, steel, composites, etc.). Conventional systems use a dual selection system to achieve a range of output levels. For example, a first selector can correspond to a relatively large range of values, whereas a second selector can provide fine-tuning within the range. However, such systems require a user to adjust the first selector, and then adjust the second selector. This process requires time and training, and can be disruptive to a welding operation. Therefore, a system that provides a single input device to achieve a desired output level is desirable

SUMMARY

An output control for a welding-type power supply and methods for operating the control are disclosed substantially as illustrated by and described in connection with at least one of the figures. In particular, the output control is configured to control a first contactor and a second contactor based on a selected weld output value from an input device, and to adjust a weld output of the system based on the selected weld output value.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
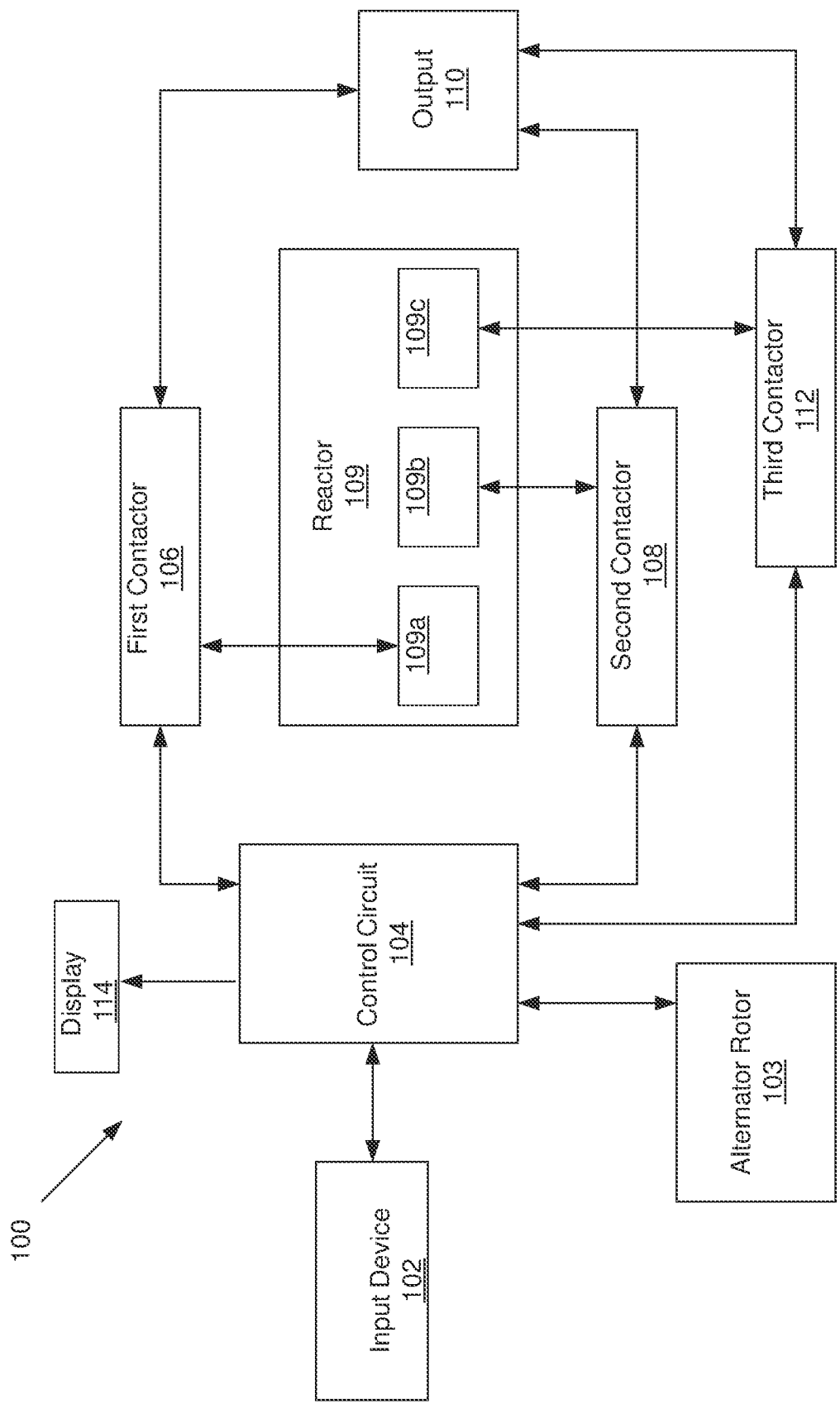
FIG. 1 is a functional diagram of an output control, in accordance with aspects of this disclosure.

Conventional welding machines use a variety of technologies to convert high voltage alternating current (AC) to low voltage direct current (DC) for welding operations. Some conventional systems use a reactor on the AC side of a welding circuit to create a desirable output volt-amp curve for welding tools (e.g., a welding type torch). This reactor is often "tapped", meaning multiple connections are made on a single coil to engage different numbers of turns on that coil. For example, increasing the number of turns adds more reactance and therefore less output current, while fewer turns corresponds to less reactance and a higher amperage output.

Selecting the desired "tap" and connection has traditionally been done by a manual switch. For example, a user controls a selector (e.g., a control knob) to select a corresponding range of welding outputs. In this example, a variable range position or tap covers a first output range (e.g., 50 to 80 amps), a second output range (e.g., 70 to 110 amps), a third output range (e.g., 100 to 150 amps), and so on. In this example, the tap of the reactor is used to select the weld output range.

However, a second fine adjustment knob is needed to accurately set the welding output within each selected range. In engine driven welding equipment using traditional tapped reactor power conversion technology, this fine adjustment is done with a rheostat, such that rotating the rheostat reduces or increases the output (e.g., a generator field current). The field current is directly proportional to the output, such that the rheostat serves as a fine control of the welding output.

Although cumbersome, such a control is widely used due to the simplicity of operation and reliability of the components. Variations have been introduced, such as replacing the reactor taps with large relays controlled by range selection toggle switches, and rheostats replaced with PC board level encoders or potentiometers. Despite these variations, the broader system output range is still selected by a first user control, and fine adjustment of the system output is still separately set by the user.

Disclosed examples automatically set the range tap (e.g., the number of turns used in the reactor) so that a single user interface (e.g., a selector knob) is configured to select the weld output of the welding machine. In this manner, no additional or separate selection is required of the user to achieve the desire welding output. The described output control is operated by a single output selection device with a complete amperage scale configured to select an entire range of outputs available through the power supply to be controlled. By contrast, conventional power supply controls are not equipped with a complete scale to select the various output amperage in power supplies with multiple range selection option, nor do conventional power supply controls have multiple output amperage scales that are specific to the range being used.

In an example, an output control for a welding-type power supply is disclosed. The output control includes a first contactor associated with a first weld output range and a second contactor associated with a second weld output range. An input device is configured to select a weld output value from the first weld output range and the second weld output range. A control circuit is configured to control the first contactor and the second contactor based on a selected weld output value, and to adjust a weld output based on the selected weld output value of the input device.

In some examples, the control circuit is configured to engage the second contactor and disengage the first contactor in response to the selected weld output value corresponding to the second weld output range. The control circuit is configured to transition from the first weld output range to the second weld output range when the selected weld output value is within the second weld output range. The control circuit is configured to transition from the second weld output range to the first weld output range when the selected weld output value is within the first weld output range.

In examples, the input device is a single knob configured to select the weld output value. The control can include a display to provide an indication of a value of the weld output based on an engaged contactor and a selected weld output value.

In some examples, the control includes a third contactor associated with a third weld output range, the control circuit further configured to control the third contactor based on the selected weld output value, and to adjust a weld output within the third weld output range based on the selected weld output value.

In examples, the first weld output range overlaps the second weld output range, and/or the second weld output range overlaps the third weld output range. The control circuit is configured to control the welding system to output a substantially linear and continuous increase through the first weld output and the second weld output range.

The control circuit is configured to adjust the weld output within each of the first weld output range and the second weld output range by changing a field current of an engine-driven generator.

The control circuit is configured to increase the weld output by controlling the contactors and increase the field current, and to decrease the weld output by controlling the contactors and decrease the field current.

In other examples, a method of controlling a welding-type power supply is disclosed. The method includes controlling a first contactor associated with a first weld output range and a second contactor associated with a second weld output range based on a first input from an input device. Selecting a weld output value via the input device. And adjusting a weld output within the first weld output range or the second weld output range based on the selected weld output value.

In an example, the input device is a selector knob operatively connected to a control circuit configured to control the first and second range contactors.

In some examples, the method includes engaging the second range contactor corresponding to the second weld output range in response to the selected weld output value corresponding to the second weld output range, and disengaging the first contactor in response to the selected weld output value.

In disclosed examples, the method transitions from the first weld output range to the second weld output range when the selected weld output value is within the second weld output range. In some examples, the method includes transitioning from the second weld output range to the first weld output range when the selected weld output value is within the first weld output range.

In some examples, the first weld output range overlaps the second weld output range. In examples, the method includes controlling a third contactor associated with a third weld output range based on the selected weld output value, and adjusting a weld output within the third weld output range based on the selected weld output value.

In examples, the method also includes comparing a measured weld output value to the selected weld output value, determining whether a change from measured weld output value to the selected weld output value will result in a higher output or a lower output, disengaging the first engage the second in response to higher output, and disengaging the second and engage the first in response to the low output.

In disclosed examples, a power output is controlled via conversion circuitry configured to provide welding-type power for a welding-type tool. For example, the welding-type tool may be a welding-type torch, a plasma cutter, a wire feeder, or an induction heating device.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit" includes any analog and/or digital components, power and/or control elements, such as a microprocessor, digital signal processor (DSP), software, and the like, discrete and/or integrated components, or portions and/or combinations thereof.

As used herein, the terms "first" and "second" may be used to enumerate different components or elements of the same type, and do not necessarily imply any particular order. For example, while in some examples a first compartment is located prior to a second compartment in an airflow path, the terms "first compartment" and "second compartment" do not imply any specific order in which air flows through the compartments.

FIG. 1 is a block diagram of an output control 100, such as for a welding-type power system. The example output control 100 includes an input device 102 (e.g., a selector knob) configured to select from a range of output values. The input device 102 is connected to a control circuit 104 to control a first contactor 106, a second contactor 108, and a third contactor 112. The output control 100 may also comprise a display 114 to provide, for example, an indication of a value of the weld output based on an engaged contactor and a selected weld output value. Although three contactors are illustrated in the example of FIG. 1, other number of contactors can be used to provide an expanded range of output values. Each contactor is operatively connected to an output 110. The contactors 106, 108, 112 draw power from a generator by contacting one or more coils of a reactor 109, such as a first coil 109a, a second coil 109b, and a third coil 109c, corresponding to the first, second, and third contactors 106, 108, 112 respectively. The output 110 is configured to provide a power output via the first, second, and third contactors 106, 108, 112 to a welding-type torch (e.g., MIG, TIG, GMAW, FCAW, plasma cutter, etc.), a preheating device, a wire feeder, etc., as well as provide battery level power to charge a battery.

The input device 102 is configured to accept a user input and communicate the desired output value to the control circuit 104. The control circuit 104 is configured to determine the output value of the controller 100 (e.g., a power output value at the output 110), and to determine whether the output value corresponds to a range associated with the first contactor 106, the second contactor 108, or the third contactor 112. For example, if both the measured output value and a selected power output value correspond to a range of output values associated with the first contactor 106, the control circuit 104 is configured to adjust a field current within the first contactor 106.

In another example, if the measured output value is associated with the first contactor 106 and the selected output value is associated with the second contactor 108, the control circuit 104 is configured to transition between contactors. The control circuit 104 determines that the transition is from the first contactor 106 to the second contactor 108. Thus, the control circuit 104 increases the field current associated with the first contactor 106 to an output value within the range of the second contactor 108. The control circuit 104 then disengages the first contactor 106, and engages the second contactor 108. Once engaged, the control circuit 104 adjusts a field current within the range of the second contactor 108 to achieve the selected power output value. The field current can be drawn from an alternator rotor 103 in some examples.

Accordingly, selection and control of a welding type power supply is automatically provided. Specifically, the control system 100 is configured to employ a single input device 102 (e.g., one knob) for controlling output of a tapped reactor-type welding power supply by automatically selecting the reactor range based on a selected position of the input device 102. This system thus avoids the need to manipulate multiple dials. Additionally or alternatively, the example system enables remote command of the output amperage (e.g., controlling the output amperage of the power supply) without requiring the remote device to provide command signals for configuring the contactors 106, 108, 112.

Figure 2:
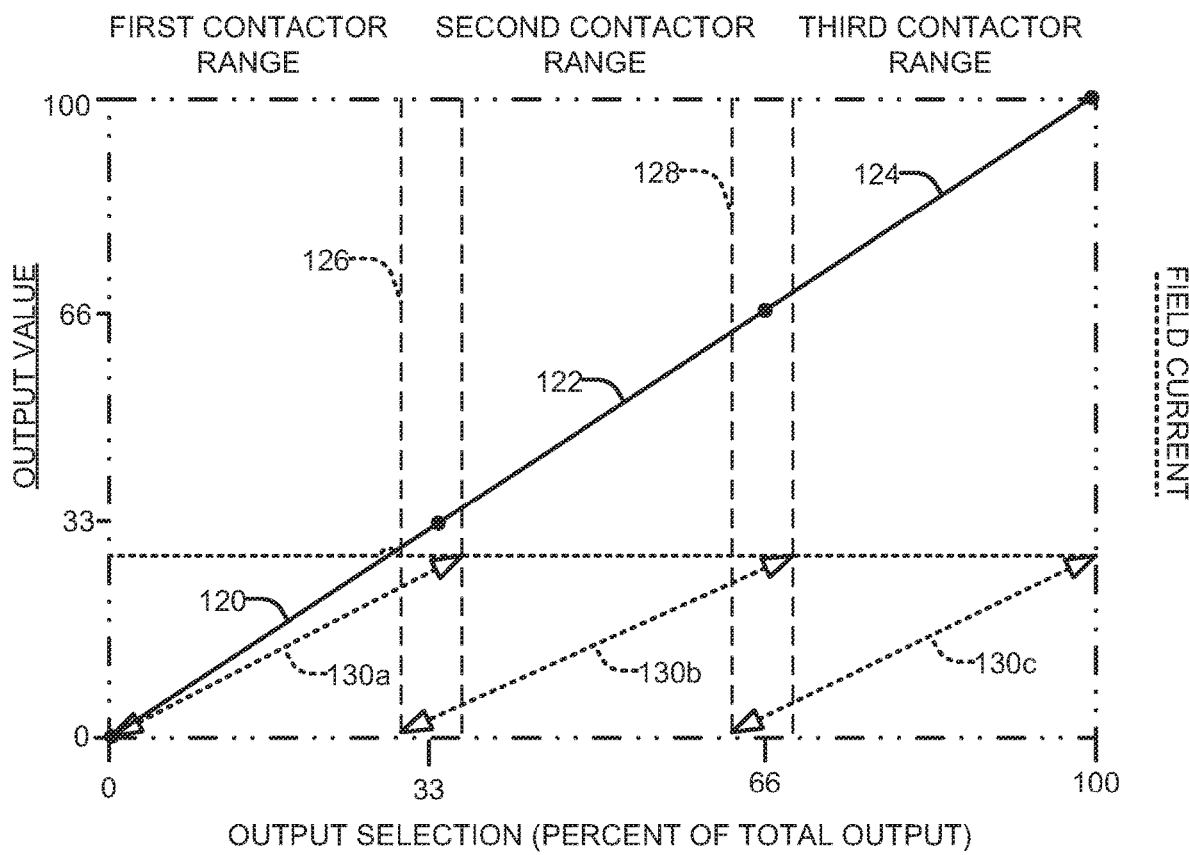
FIG. 2 illustrates an example implementation of an output control, in accordance with aspects of this disclosure.

FIG. 2 illustrates an example implementation of relationships between a selected output amperage, measured output amperage, and a field current, which may be controlled by the controller 100 described in FIG. 1. In this example, a graphical representation of an output provides a percentage of a total output available through an associated power supply on the X-axis, and a desired output value on the Y-axis. The output value may be in any suitable units (e.g., voltage, amperage, joules, watts, etc.), in accordance with the particular power source associated with the controller 100.

The controller 100 automatically transitions between the contactors 106, 108 associated with a current output value associated with a given contactor and a desired output value associated with a different contactor. This transition occurs as the selected output value crosses an output range transition zone along an output value curve.

A smooth, continuous transition is possible because the input device 102 provides an electronic input to the control circuit 104, which controls each range contactor and the field current. The combination of range contactor control and adjustment of field current value can provide a selected power output across multiple ranges in response to a single input (e.g., corresponding to a knob selection position).

As shown in FIG. 2, a first contactor range 120 corresponds to the first contactor 106, a second contactor range 122 corresponds to the second contactor 108, and a third contactor range 124 corresponds to a third contactor (not shown).

In an example, a current power output value is associated with the first contactor range 120. Thus, the first contactor 102 is engaged to allow the field current 130a to be adjusted within the first contactor range 120 in the circuit. Such a position corresponds to a relatively low output volt-amp output curve relative to the second contactor range 122 and third contactor range 124.

As the power output value selected via the input device 102 is increased, the control circuit 104 increases the field current to increase the output power value in the first contactor range 120. If the selected output value is beyond a maximum value of the first contactor range 120 (i.e. a maximum field current, at 33 in this example), the control circuit 104 engages the second contactor 108 and disengages the first contactor 106 at transition zone 126. Simultaneously, the field current 130b associated with the second contactor 108 is adjusted to provide a smooth transition from the first contactor range 120 to the second contactor range 122. As noted, the transition zone 126 allows for some field current adjustment, such that the range of values of the first contactor range 120 and the second contactor range 122 overlap. Accordingly, the output 110 automatically experiences a smooth increase in output power even as the control circuit 104 transitions between contactors.

The control system 100 can include more than two contactors, the implementation described with respect to the first and second contactors 106, 108, can extend to a greater number of contactors. For example, as the selected output value increases beyond the second contactor range 122, the control circuit 104 again increases field current 130b within the second contactor range 122 to increase the output value. At transition zone 128, a third contactor would be engaged at an output value corresponding to the final value along the second contactor range 122 (i.e. 66 in the example of FIG. 1), and the second contactor 108 would disengage.

This increase would continue for as many contactor ranges as are present in the associated power supply. In this way, the input device 102 provides a continuous output curve, from the minimum value (i.e. 0 in the example of FIG. 2) to the maximum value (i.e. 100) with no need for additional input selection.

Conversely, the control circuit 104 is configured to transition from a higher output value to a lower output value by a reverse process. Accordingly, if the current output value was along the third contactor range 124 and the desired output value was along the second contactor range 122, the control circuit 104 could determine that a transition from the third contactor to the second contactor 108 was pending. The control circuit 104 would lower the field current 130c to reach the transition zone 128, engage the second contactor 108, set a field current along the second contactor range 122 associated with the minimum value along the third contactor range 124 (i.e. 66 in the example of FIG. 2), and disengage the third contactor.

In some examples, near transition zones, the control would implement a hysteresis such that a movement of the input device 104 is required to change from one range contactor to another. Moreover, if the selected output crosses two or more transition zones, the process is repeated across multiple range contactors until the appropriate range and selected output value is achieved.

Figure 3:
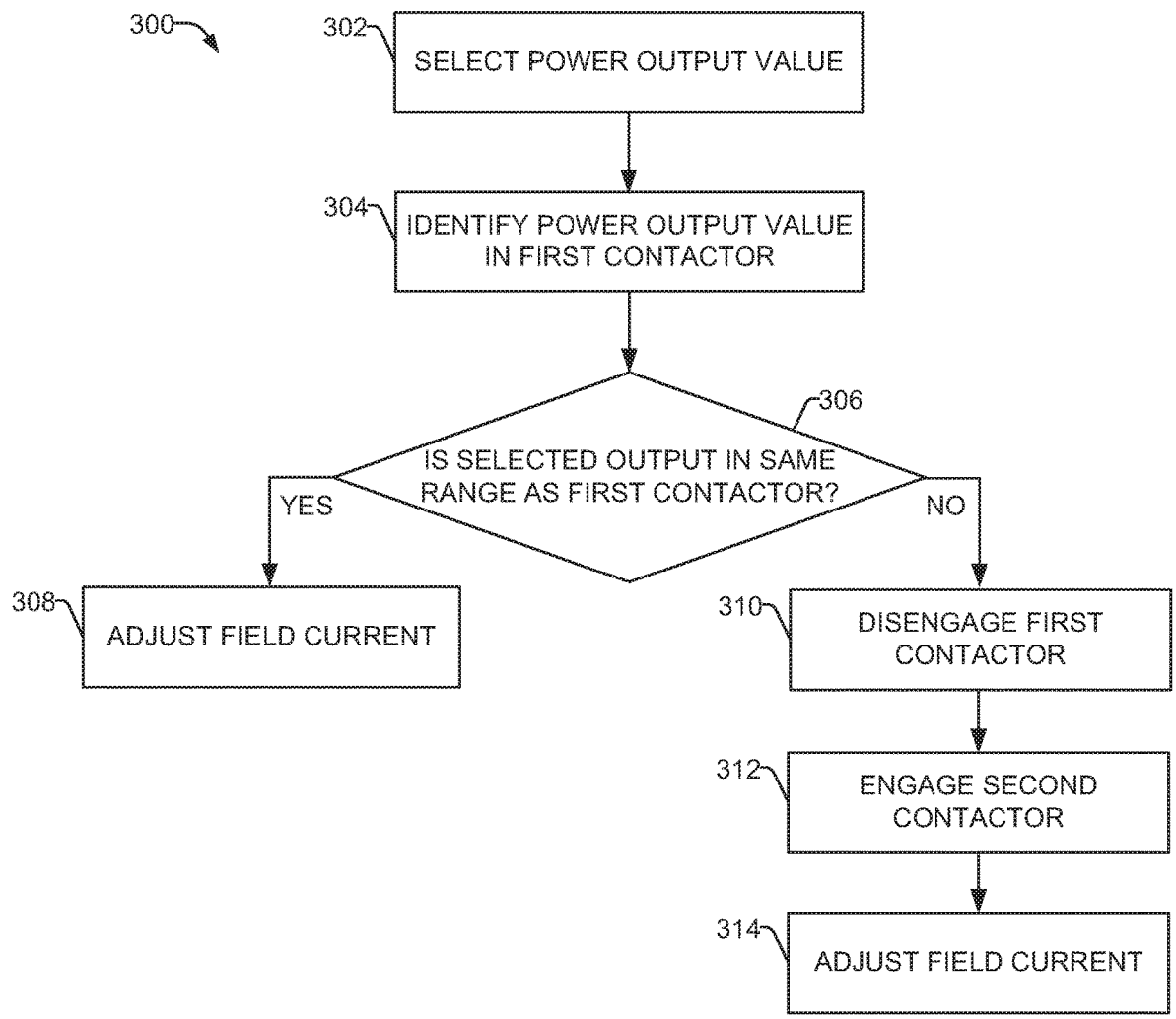
FIG. 3 illustrates an example method of operating an output control, in accordance with aspects of this disclosure.

FIG. 3 is a flowchart illustrating example method 300 of operating an output control, for example the output control 100 of FIG. 1. The method 300 of FIG. 3 may be implemented by the control circuit 104 of FIG. 1 by executing machine readable instructions, such as stored on a non-transitory machine readable storage device. At block 302, a power output value is selected (e.g., a weld power value via input device 102). At block 304, a controller (e.g., the control circuit 104) identifies the point at which the current output power value sits along the range of power output values. In an example, the current output power value is within the range associated with the first contactor 106.

At block 306, the selected output value is compared against the first contactor range 122. If the selected output is also along the first contactor range 122, the control circuit 104 adjusts a field current based on the relationship between the output current and the field current within the first contactor range 122, from the measured output value to the selected output value in block 308. If the selected value is outside the first contactor range 122, the control circuit 104 disengages the appropriate contactor in block 310, such as the first contactor 106. Accordingly, at block 312, the second contactor 108 is engaged. At block 314, the control circuit 104 adjusts the field current based on the relationship between the output current and the field current within the second contactor range 124 to the value associated with the maximum output value of the first contactor range 122 (i.e. 33 in the example of FIG. 2).

Accordingly, as disclosed herein, the configuration of components provides multiple advantages over existing controls. For example, the industry desires a single input device to control adjustment over a range of output values from the power supplies rated minimum to the rated maximum without the need to select ranges independently. Further, a single output scale displays the selected output value, which serves to eliminate confusion about various scales. The control also allows reliable welding technology to be used in a way that is similar to newer topology in industrial equipment.

The present methods and systems may be realized in hardware, software, and/or a combination of hardware and software. Example implementations include an application specific integrated circuit and/or a programmable control circuit.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. An output control for a welding-type power supply comprising:
   a reactor comprising a winding having a first end, a second end, and a plurality of turns between the first end and the second end;
   a first contactor associated with a first weld output range configured to tap into the reactor at a first position of the winding to define a first set of turns between the first end and the first position;
   a second contactor associated with a second weld output range configured to tap into the reactor at a second position of the winding to define a second set of turns between the first end and the second position,
      wherein the second set of turns includes the first set of turns, and
      wherein the first weld output range overlaps with the second weld output range to define a transition range;
   an input device comprising a single knob configured to select a weld output value from the first weld output range and the second weld output range; and
   a control circuit configured to:
      control each of the first contactor and the second contactor automatically based on a selected weld output value from the single knob;
      determine whether the weld output value corresponds to the first weld output range or the second weld output range to yield determined weld output range; and
      adjust a weld output within the determined weld output range by adjusting a field current thereof to achieve the selected weld output value of the input device.

2. The output control as defined in claim 1, wherein the control circuit is configured to engage the second contactor and disengage the first contactor in response to the selected weld output value corresponding to the second weld output range.

3. The output control as defined in claim 1, wherein the control circuit is configured to transition from the first weld output range to the second weld output range when the selected weld output value is within the second weld output range.

4. The output control as defined in claim 1, wherein the control circuit is configured to transition from the second weld output range to the first weld output range when the selected weld output value is within the first weld output range.

5. The output control as defined in claim 1, further comprising a display to provide an indication of a value of the weld output based on an engaged contactor and a selected weld output value.

6. The output control as defined in claim 1, further comprising a third contactor associated with a third weld output range configured to tap into the reactor at a third position on the winding, the control circuit further configured to:
   control the third contactor based on the selected weld output value; and
   adjust a weld output within the third weld output range based on the selected weld output value.

7. The output control as defined in claim 6, wherein the second weld output range overlaps the third weld output range.

8. The output control as defined in claim 1, wherein the control circuit is configured to control the weld output to continuously increase through the first weld output and the second weld output ranges.

9. The output control as defined in claim 1, wherein the control circuit is configured to change the field current of an engine-driven generator.

10. The output control as defined in claim 1, wherein the control circuit is configured to:
    increase the weld output by controlling the first and second contactors and increase the field current; and
    decrease the weld output by controlling the first and second contactors and decrease the field current.

11. The output control of claim 1, wherein the control circuit is configured to control the weld output to continuously increase through the first weld output range and the second weld output range.

12. The output control of claim 1, wherein the control circuit is configured to control the weld output to increase linearly through the first weld output range and the second weld output range.

13. The output control as defined in claim 1, wherein the control circuit is configured to transition between the first contactor and the second contactor at the transition range.

14. The output control of claim 13, wherein the control circuit is configured to adjust a field current associated with the first contactor or the second contactor during transition between the first contactor and the second contactor.

15. The output control of claim 14, wherein the control circuit is configured to adjust a field current associated with the second contactor during transition from the first contactor to the second contactor.

16. The output control of claim 14, wherein the control circuit is configured to adjust a field current associated with the second contactor during transition from the second contactor to the first contactor.

17. The output control of claim 1, wherein the first weld output range is 50 to 80 amps and the second weld output range is 70 to 110 amps.

18. An output control for a welding-type power supply comprising:
- a reactor comprising a winding having a first end, a second end, and a plurality of turns between the first end and the second end;
- a first contactor associated with a first welding current range and configured to tap into the reactor at a first position of the winding to define a first set of turns between the first end and the first position;
- a second contactor associated with a second welding current range and configured to tap into the reactor at a second position of the winding to define a second set of turns between the first end and the second position,
  wherein the second set of turns includes the first set of turns, and
  wherein the first welding current range overlaps the second welding current to define a transition range;
- an input device comprising a single knob configured to select a weld output value from the first welding current range and the second welding current range; and
- a control circuit configured to:
  - control each of the first contactor and the second contactor automatically based on a selected weld output value from the single knob;
  - determine whether the weld output value corresponds to the first weld output range or the second weld output range;
  - transition between the first contactor and the second contactor at the transition range when the output value corresponds to the second weld output range;
  - adjust a field current associated with the second weld output range during said transition between the first contactor and the second contactor at the transition range; and
  - adjust a weld output based on the selected weld output value of the input device.

19. The output control as defined in claim 18, further comprising a third contactor associated with a third welding current range configured to tap into the reactor at a third position of the winding that is associated with a third set of turns within said plurality of turns that overlaps with said second set of turns, the control circuit further configured to:
- control the third contactor based on the selected weld output value; and
- adjust a weld output within the third welding current range based on the selected weld output value.

* * * * *